United States Patent [19]

Bowes et al.

[11] 4,436,337

[45] Mar. 13, 1984

[54] VEHICLE BODY MOLDING ASSEMBLY

[75] Inventors: Laurence B. Bowes, Utica; Thomas J. Gray, Warren, both of Mich.

[73] Assignee: General Motors Corporation, Detroit, Mich.

[21] Appl. No.: 404,562

[22] Filed: Aug. 2, 1982

[51] Int. Cl.³ .................................... B62D 25/02
[52] U.S. Cl. ................................ 296/201; 296/93; 52/716; 52/400; 52/208
[58] Field of Search ............ 296/93, 201; 52/208, 52/716, 717, 718, 400

[56] References Cited

U.S. PATENT DOCUMENTS

| 2,733,096 | 1/1956 | Waterhouse | 296/202 |
| 2,814,525 | 11/1957 | Thomas | 296/93 |
| 3,189,143 | 6/1965 | Adams | 296/93 |
| 3,968,613 | 7/1976 | Meyer | 52/400 |
| 3,981,697 | 9/1976 | Buckthorpe | 52/400 |
| 4,401,340 | 8/1983 | Ankrapp | 296/93 |

Primary Examiner—Robert R. Song
Attorney, Agent, or Firm—Herbert Furman

[57] ABSTRACT

A vehicle body molding assembly which includes an elongated body member of angular cross-section having integral outwardly extending attachment portions which interengage with reversely bent edge portions and a body molding to retain the molding to the body member.

3 Claims, 9 Drawing Figures

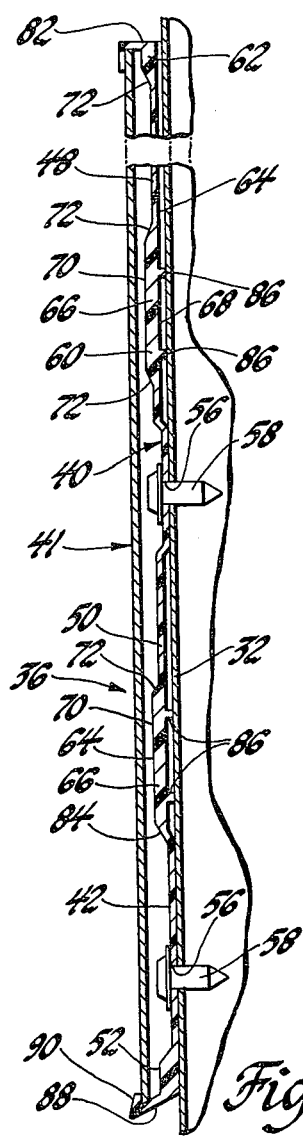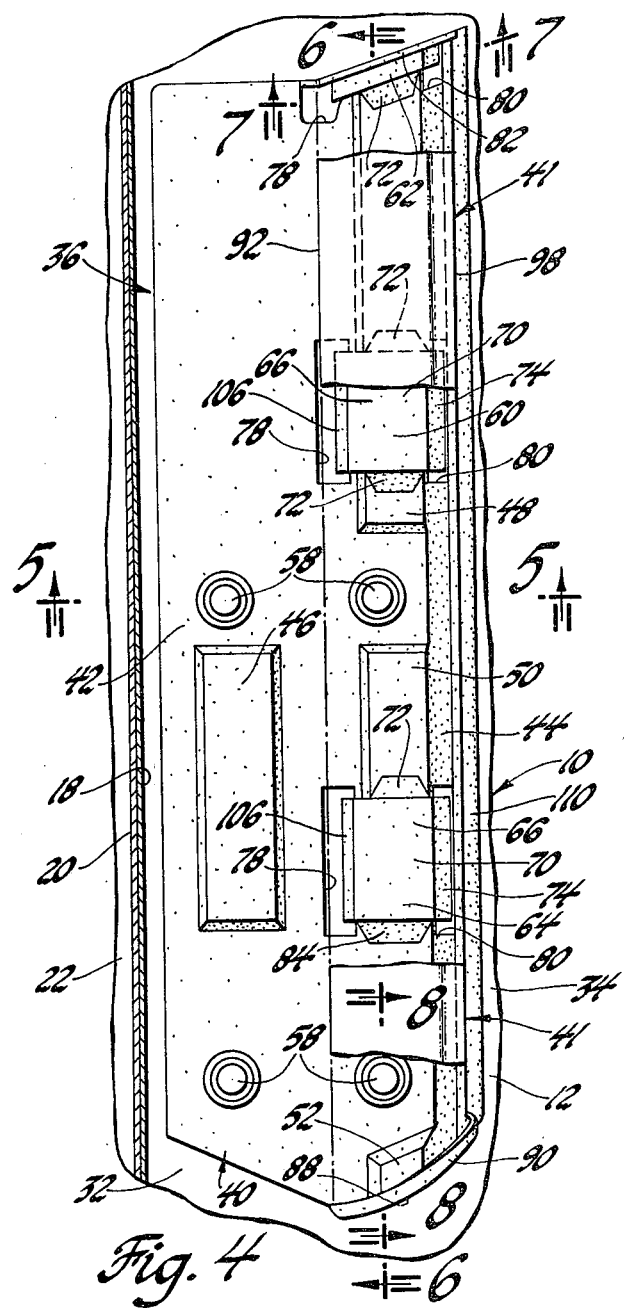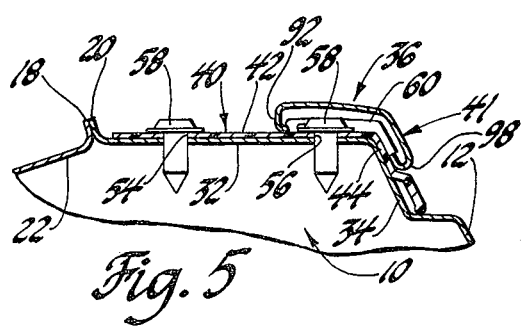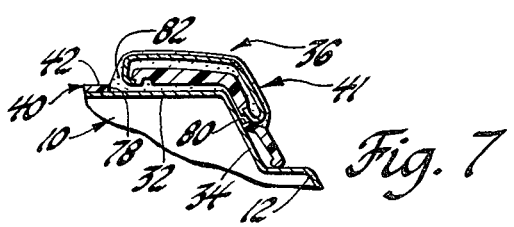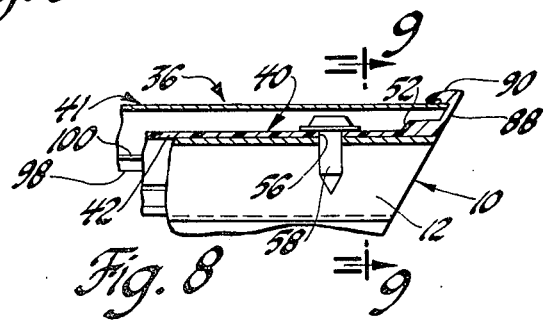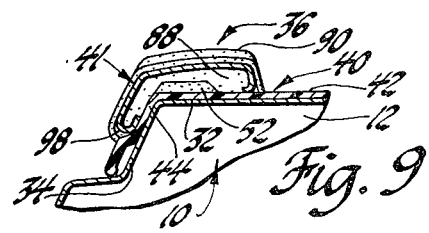

VEHICLE BODY MOLDING ASSEMBLY

This invention relates generally to vehicle body molding assemblies and more particularly to an improved reveal molding assembly for vehicle bodies.

It is common to use reveal molding assemblies in vehicle bodies to both finish and decorate the exterior wall of the body around a window opening therein. The assembly of this invention is of this general type but differs from known prior art assemblies in several respects.

The subject assembly includes an elongated body member of angular cross-section which generally matches a complementary shaped portion of a vehicle body panel outwardly of a window opening therein. The body member is of molded plastic and includes attachment portions which are located generally parallel to the body member and extend outwardly thereof. The end edges of the attachment portions are integrally secured to the body member and the side edges are located outwardly of enlarged openings through the body member. The attachment portions have backup ribs which engage the body panel to prevent deflection of the attachment portions inwardly toward the body panel. An elongated molding includes reversely bent flanges which overlie the openings in the body member and engage the body member to each side of such openings. The flanges terminate in edges, each of which engages a side edge of the attachment portion to thereby secure the molding to the body member.

In certain window installations, the ends of the molding have to be finished. In such instances one end of the body member includes an integral return bent flange which receives an end edge portion of the molding to thereby capture and retain this edge portion to the body member. The other end of the body member includes a flange which is abutted by the other end of the molding. Additionally, the body member, immediately adjacent this flange, includes an attachment portion which is generally one-half or less of the other attachment portions for securing the other end of the molding to the body member.

The primary feature of this invention is that it provides an improved reveal molding assembly for vehicle bodies which includes a molded plastic body member of angular cross-section which abuts a complementary shaped portion of a vehicle body and includes attachment portions which are located outwardly of and parallel to the body member, with the end edges of the attachment portions being integral with the body member and the side edges being spaced outwardly of openings through the body member. Another feature is that the assembly includes a molding having reverse bent flange portions which overlie and conceal the openings in the body member and edgewise engage the side edges of the attachment portions in a snap fit relationship to retain the molding to the body member. A further feature is that the attachment portions have backup ribs which seat on the body panel to prevent deflection of the attachment portions relative to such panel. Yet another feature is that one end of the molding may be received within a complementary shaped integral pocket at one end of the body member and the other end of the molding may abut a lateral flange of the body member and be secured in such abutting relationship by a partial attachment portion.

These and other features will be readily apparent from the following specification and drawings wherein:

FIG. 4 is a partially broken away view taken generally along line 4—4 of FIG. 2.

FIG. 5 is a sectional view taken generally along line 5—5 of FIG. 4.

FIG. 6 is a sectional view taken generally along line 6—6 of FIG. 4.

FIG. 7 is a sectional view taken generally along line 7—7 of FIG. 4.

FIG. 8 is a sectional view taken generally along line 8—8 of FIG. 4, and

FIG. 9 is a view taken along line 9—9 of FIG. 8.

Figure 1:
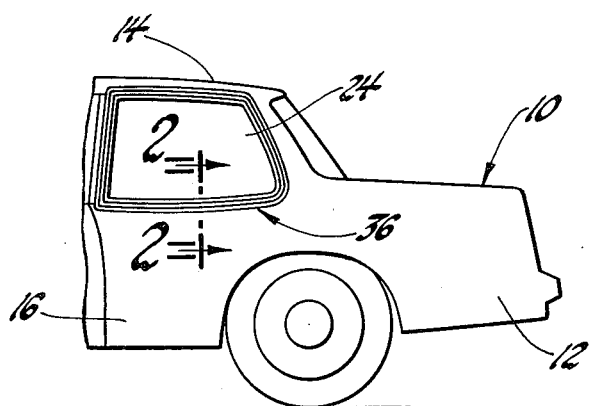
FIG. 1 is a partial view of the rear portion of a vehicle having a reveal molding assembly according to this invention.
Figure 2:
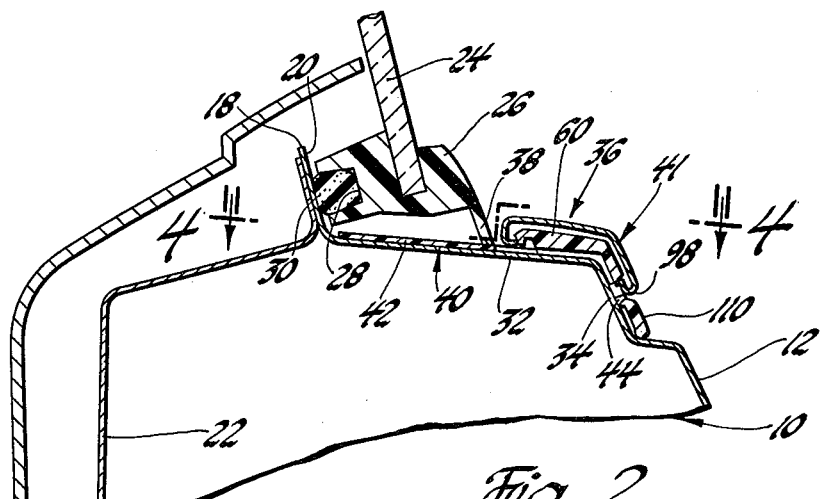
FIG. 2 is an enlarged sectional view taken genrally along line 2—2 of FIG. 1.

Referring now particularly to FIGS. 1 and 2 of the drawings, a vehicle body designated generally 10 includes a quarter panel 12, a roof panel 14 and a pillar assembly 16 which cooperatively define a quarter window opening 18. As shown in FIG. 2, the window opening 18 is defined along its lower edge portion by a pinchweld flange 20 provided by the quarter panel 12 and a quarter inner panel 22. Similar pinchweld flanges are provided by flanges of the other body panels to define the other edge portions of the window opening 18. A quarter window 24 closes the opening 18 and is secured to the pinchweld flanges defining such opening by having the edge portion thereof encased in a plastic molding 26. The molding 26 includes an inwardly opening channel 28 which receives adhesive 30 to secure the window 24 and the molding 26 to the pinchweld flange 20 and the other pinchweld flanges defining the opening 18. At spaced locations, not shown, suitable screws are driven outwardly through the pinchweld flanges and into the molding 26 to retain the molding and the window 24 in place until the adhesive 30 is cured.

The panel 12 outboard of the pinchweld flange 20 is of generally angular cross-section and includes a first flange or wall 32 and a second angular flange or wall 34.

A reveal molding assembly 36 according to this invention covers flanges 32 and 34 outboard of an integral flexible flange 38 of the molding 26 to complete and decorate the exterior of the body 10 around the quarter window 24. The assembly 36 generally includes a molded plastic body member 40 and a molding member 41 which is snap fitted to the body member.

As shown in FIGS. 3 through 9, the body member 40 includes a first planar base portion 42 which seats on wall 32 and a second angular base portion 44 which seats on the wall 34. The angular shape of the base portions 42 and 44 conforms to that of the walls 32 and 34. The base portion 42 includes a number of integral upwardly embossed truncated ribs 46, 48 and 50 and a rib 52 for strengthening purposes. Additionally, the base portion 42 will include pairs of openings 54 and 56 for receipt of fasteners 58 which secure the body member 40 to the wall 32. Both sets of openings 54 and 56 may not be necessary in all installations. Further, for ease of replacement of the body member, it may be best to dispense with the openings 54 since the fasteners 58 through such openings are located underneath the molding 26 and access cannot be gained thereto without removal of the window 24 and the molding 26.

As best shown in FIG. 4, attachment portions 60 and 62 are integral with rib 48 and an attachment portion 64 is integral with rib 50. The attachment portion 60 has a first portion 66 with base or inner wall 68, FIG. 3, coplanar with the base or inner wall of the rib 48. Portion 66 is thicker than rib 48 and its outer wall 70 is located outwardly of the plane of the outer wall of the rib and joined to the outer wall of the rib by integral ramp portions 72, FIG. 4. The attachment portion 60 further includes a second portion 74 which is integral with portion 66 and extends angularly therefrom. The base wall 76 of portion 74 is located parallel to and outwardly of the outer wall of base portion 44. Walls 68 and 76 are located at the same angle to each other as the inner and outer walls of portions 42 and 44 are respectively located to each other.

A first rectangular elongated opening 78 is provided in the base portion 42 underneath the free side edge of the first portion 66 of the attachment portion 60 and a second like opening 80 is provided in the base portion 44 underneath the free side edge of the second portion 74 of the attachment portion 60. Portion 74 is thus cantilevered from portion 66. The attachment portion 62 is a partial attachment portion 60 and therefore like numerals have been used. The attachment portion 62 terminates at an integral end flange 82 which traverses body member 40, FIGS. 4 and 7.

Attachment portion 64 is the same as attachment portion 60, except as hereinafter noted, and therefore like numerals have been used for like parts. Ribs 50 extends only to the upper end of attachment portion 64, FIG. 4, rather than beyond both ends thereof. Accordingly, the lower end of attachment portion 64 is integrally secured directly to base portion 42 by an angular ramp portion 84, FIG. 6.

Figure 3:
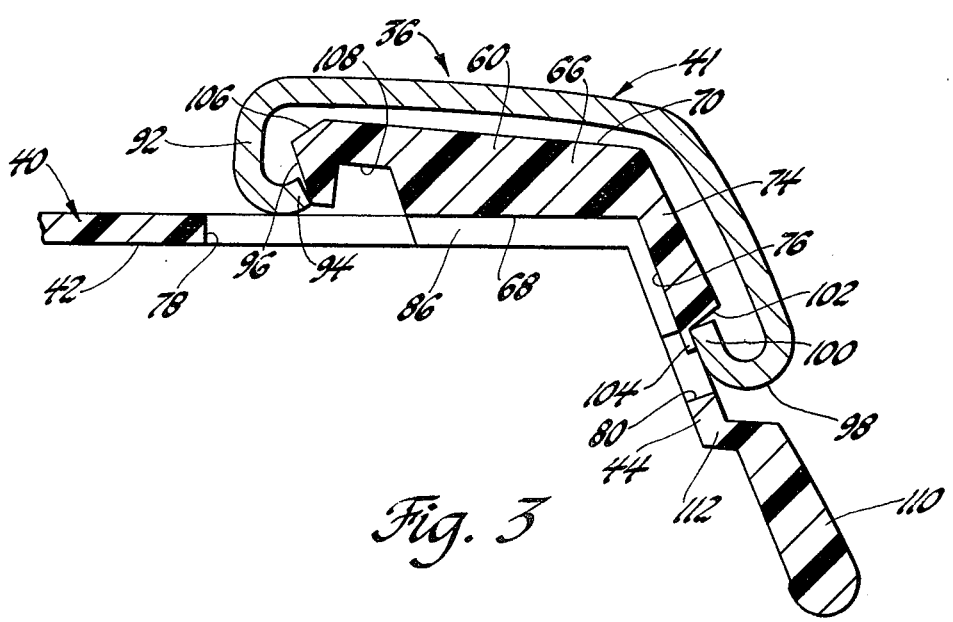
FIG. 3 is an enlarged view of a portion of FIG. 2.

As shown in FIGS. 3 and 6, a pair of shallow ribs 86 extend transversely of each of the attachment portions 60 and 64 and seat on the flange 32 of the quarter panel 12.

The rib 52 as shown in FIGS. 4, 6, 8 and 9 merges into an end wall 88 having a lateral extending terminal flange 90 which cooperatively define a pocket for a purpose to be described. Rib 52 is not embossed upwardly of base portion 42 as shown in FIG. 6.

The molding member 41 is formed of metal and generally conforms in cross-sectional shape to that of the body member 40, the flanges 32 and 34 of the quarter panel 12 and the attachment portion 60, 62 and 64. The molding member includes a first longitudinally extending side flange 92 extending generally normal to the base portion 42 and terminating in a reversely bent longitudinally extending flange 94 which overlies opening 78 and engages edgewise with a wall 96 of the free edge of the portion 66 of attachment portion 60. The outer side edge of the molding member 41 includes a longitudinally extending arcuate side flange 98 and terminates in a reversely bent flange 100 which overlies opening 80 and engages edgewise with a wall 102 of the free edge of portion 74 of attachment portion 60. Flange 100 also seats on lip 104. Flanges 94 and 100 similarly engage like numbered walls and lips of attachment portions 62 and 64 and respectively seat on base portions 42 and 44 intermediate openings 78 and 80. One end of the molding member 41 abuts the flange 82 while the other end of the molding member fits within the pocket defined by wall 88 and flange 90.

The molding member 41 is assembled to the body member after the body member has been mounted to the flanges 32 and 34 of the quarter panel by fasteners 58. An end of the molding member is first inserted under flange 90 in engagement with the wall 88. Thereafter the molding is moved toward the body member and snap fitted over the attachment portions 60, 62 and 64 as flange 94 slides along walls 106 until it engages wall 96 and base portion 42 and flange 100 slides over walls 102 and engages lips 104 and base portion 44. The attachment portions each include an inwardly opening groove 108 inwardly of walls 96 and 106 in order to increase the flexibility of the free side edge of the portion 66 of the attachment portions during mounting of the molding member to the attachment portions. The other end of the molding member engages flange 82 after assembly.

It will be noted with reference to FIG. 3 that the body member includes a terminal thickened decorative rib 110 which overlies flange 34 and is joined by an integral angular wall 112 to the base portion 44.

From the foregoing description it can be seen that the body member includes a number of integral attachment portions which extend outwardly thereof and which have side edges interfitting with the reverse bent flanges of the molding in order to secure the molding to the body. The attachment portions are backed up by ribs which engage the body. The flange of the molding generally cover the openings through the body member located below the side edges of the attachment portions.

The flange 82 and the wall 88 and flange 90 may each be dispensed with depending on the type of installation. Further, the molding may be in any number of pieces necessary to extend around the window opening.

Thus this invention provides an improved vehicle body molding assembly.

The embodiments of the invention in which an exclusive property or privilege is claimed are defined as follows:

1. A vehicle body reveal molding assembly comprising, in combination, an elongated body member of angular cross-section for abutting a complementary shaped portion of a vehicle body panel, an angular cross-section molding attachment portion extending outwardly of the plane of the body member, means integrally attaching opposite end edges of the attachment portion to the body member, the body member including an opening therethrough underneath each side edge of the attachment portion, and an elongated molding of angular cross-section having side edge portions provided with elongated terminal flanges reversely bent underneath the molding, the edge portions and flanges overlying and concealing the openings in the body member underneath each side edge of the attachment portion, and seating on the body member to each side of each opening, the flanges edgewise engaging the side edges of the molding attachment portion to releasably secure the molding to the body member.

2. A vehicle body reveal molding assembly comprising, in combination, an elongated body member of angular cross-section for abutting a complementary shaped portion of a vehicle body panel, an angular cross-section molding attachment portion located generally parallel to the plane of the body member and extending outwardly therefrom, means integrally attaching opposite end edges of the attachment portion to the body member, the body member including an opening therethrough underneath each side edge of the attachment portion, rib means extending from the molding attachment portion for abutting the vehicle body panel, and an elongated molding of angular cross-section having side edge portions provided with elongated terminal flanges located underneath the molding member, the side edge portions and flanges overlying the openings in the body member underneath the side edges of the attachment portion, the flanges engaging the side edges of the molding attachment portion to releasably secure the molding to the body member.

3. A vehicle body molding assembly, comprising, in combination, an elongated body member having angularly related walls for abutting complementary walls of a vehicle body panel, an elongated elevated rib embossed outwardly of one wall of the body member, an angular cross-section molding attachment including a first portion extending outwardly from the upper wall of the rib and a second portion extending angularly from one side edge thereof outwardly of the plane of the other wall of the body member, the walls of the body member including elongated openings therethrough underneath each free side edge of the first and second portions of the molding attachment, and an elongated molding member of angular cross-section having elongated terminal flanges reversely bent underneath the molding member and edgewise engaging the free side edges of the molding attachment to releasably secure the molding to the body member, the flanges overlying and concealing the openings underneath the free side edges of the molding attachment.

* * * * *